(12) United States Patent
Tsuchikiri et al.

(10) Patent No.: US 7,591,159 B2
(45) Date of Patent: Sep. 22, 2009

(54) IGNITION SWITCH DEVICE

(75) Inventors: Akihiko Tsuchikiri, Hamamatsu (JP); Takehiro Sakai, Sakai (JP); Masaaki Ueda, Sakai (JP); Keisuke Miura, Sakai (JP); Hiroshi Kawanami, Sakai (JP)

(73) Assignees: Asahi Denso Co., Ltd., Hamamatsu-shi (JP); Kubota Corporation, Osaka (JP)

( * ) Notice: Subject to any disclaimer, the term of this patent is extended or adjusted under 35 U.S.C. 154(b) by 0 days.

(21) Appl. No.: 12/127,984

(22) Filed: May 28, 2008

(65) Prior Publication Data

US 2008/0295553 A1 Dec. 4, 2008

(30) Foreign Application Priority Data

May 28, 2007 (JP) .............................. 2007-140472

(51) Int. Cl.
*E05B 17/18* (2006.01)
(52) U.S. Cl. .............................. 70/252; 70/423; 70/427; 70/454; 70/455; 70/DIG. 30
(58) Field of Classification Search .................. 70/423, 70/427, 454, 455, 54–56, 252, DIG. 43, DIG. 56, 70/424–426, 453, DIG. 30, 428
See application file for complete search history.

(56) References Cited

U.S. PATENT DOCUMENTS

| 1,088,237 | A | * | 2/1914 | Mulford | 70/454 |
| 1,112,485 | A | * | 10/1914 | Snyder | 70/452 |
| 2,355,300 | A | * | 8/1944 | Johnstone | 70/455 |
| 2,388,228 | A | * | 10/1945 | Johnstone | 70/455 |
| 2,400,229 | A | * | 5/1946 | Freeman | 70/455 |
| 2,658,151 | A | * | 11/1953 | Heinz | 250/466.1 |
| 2,993,362 | A | * | 7/1961 | Baccolla | 70/454 |
| 3,583,185 | A | * | 6/1971 | Jacobi | 70/455 |
| 4,231,240 | A | * | 11/1980 | Fujita et al. | 70/173 |
| 5,477,713 | A | * | 12/1995 | Lay | 70/454 |
| 7,322,218 | B2 | * | 1/2008 | Yonemura et al. | 70/162 |
| 2005/0193788 | A1 | * | 9/2005 | Weiner | 70/454 |

* cited by examiner

*Primary Examiner*—Lloyd A Gall
(74) *Attorney, Agent, or Firm*—Sughrue Mion, PLLC

(57) ABSTRACT

An ignition switch device is provided with a switch having a key hole, and capable of being rotationally operated in a predetermined direction with an ignition key inserted to start and stop the engine of an industrial machine, a case covering the switch and formed with an insertion hole allowing the key hole to face the outside, a shutter rotatable between a closed position where the insertion hole of the case is closed, and an open position where the insertion hole is opened to allow the key hole to face outside, and a gutter formed on the surface of the case, and extending toward an outer end of the case while a base end communicates with the insertion hole.

8 Claims, 6 Drawing Sheets

IGNITION SWITCH DEVICE

This application claims foreign priority from Japanese Patent Application No. 2007-140472 filed on May 28, 2007, the entire contents of which are hereby incorporated by reference.

BACKGROUND OF THE INVENTION

1. Field of the Invention

The present invention relates to an ignition switch device which is disposed in a driver's seat of an industrial machine to start and stop an engine of the industrial machine.

2. Background Art

An industrial machine, for example, a construction machine is used in a worksite of engineering works and construction, and includes bulldozers, power shovels, and crane vehicles. An ignition switch device for starting and stopping an engine of the industrial machine is disposed in the driver's seat of such an industrial machine. By rotationally operating an ignition key while inserting the key into a key hole of such an ignition switch device, the engine is started and stopped.

A conventional ignition switch device is configured to include, for example, a switching means having a key hole allowing a regular ignition key to be inserted thereinto, and capable of being rotationally operated in a predetermined direction with the ignition key inserted to start and stop the engine of the industrial machine, and a case covering the switching means and formed with an insertion hole allowing the key hole to face the outside. It is desirable that the ignition switch device includes a shutter which can be opened and closed above the key hole in order to prevent muddy water, dust, etc. from entering the key hole. In addition, since such prior art is not related to inventions well-known in literatures, there is no information on prior art documents to be described.

However, the above conventional ignition switch device has the following problems. That is, the industrial machine is typically used in the open air in a construction site. Therefore, if a shutter is simply provided, the rain or the like which has entered the insertion hole of the case through a gap of the shutter may stagnate for a long time. As a result, there is a possibility that the rain may reach the inside of the key hole, and may cause troubles in an electric system, such as a switch. Further, there is also a probability that, during a winter season, the rain which has entered the insertion hole may freeze, and insertion of the ignition key into the key hole may be difficult.

SUMMARY OF THE INVENTION

One or more embodiments of the invention provide an ignition switch device which can quickly and satisfactorily discharge rain or the like which has entered an insertion hole of a case to prevent the rain or the like from stagnating in the vicinity of the key hole.

In accordance with a first aspect of the invention, an ignition switch device disposed in a driver's seat of an industrial machine to start and stop an engine of the industrial machine is provided with: a switching means having a key hole allowing a regular ignition key to be inserted thereinto, and capable of being rotationally operated in a predetermined direction with the ignition key inserted to start and stop the engine of the industrial machine; a case covering the switching means and formed with an insertion hole allowing the key hole to face the outside; a shutter disposed on the surface of the case, and rotatable between a closed position where the insertion hole of the case is closed, and an open position where the insertion hole is opened to allow the key hole to face outside; and a gutter formed on the surface of the case, and extending toward an outer end of the case while a base end communicates with the insertion hole.

In accordance with a second aspect of the invention, in the ignition switch device of the first aspect, a bottom surface in a communicating portion of the gutter communicating with the insertion hole of the case may be set to substantially the same height as a surface having the key hole of the switching means.

In accordance with a third aspect of the invention, in the ignition switch device of the first of second aspect, at least an upper portion of the gutter on the side of its base end may be covered with the shutter.

In accordance with a fourth aspect of the invention, in the ignition switch device of any one of the first to third aspects, a tip of the gutter may reach a lower edge of the case.

According to the first aspect, the gutter which extends toward the lower edge of the case while a base end communicates with the insertion hole is formed on the surface of the case. Thus, the rain or the like which has entered the insertion hole of the case can be quickly and satisfactorily discharged toward the lower edge of the case, and the rain or the like can be prevented from stagnating in the vicinity of the key hole.

According to the second aspect, the bottom surface in the communicating portion of the gutter communicating with the insertion hole is set to substantially the same height as the surface having the key hole of the switching means. Thus, the bottom surface and the surface having the key hole becomes substantially flush with each other. As a result, the rain or the like which has entered the insertion hole can be smoothly and surely discharged from the gutter.

According to the third aspect, at least the upper portion of the gutter on the side of its base end is covered with the shutter. Thus, at least the portion of the gutter on the side of its base end can be concealed, and the design property of the surface of the case can be improved. Also, the communicating portion communicating with the insertion hole is covered so that foreign matters or the like can be kept from entering the insertion hole through the communicating portion.

According to the fourth aspect, since the tip of the gutter reaches the lower edge of the case, the water within the insertion hole can be released from the lower edge of the case, and can prevented from stagnating at the surface of the case.

Other aspects and advantages of the invention will be apparent from the following description, the drawings and the claims.

REFERENCE NUMERALS

1: IGNITION SWITCH DEVICE
2: SWITCHING MEANS
2a: KEY HOLE
3: CASE
3a: SURFACE
3b: INSERTION HOLE
4: SHUTTER
4a: CUTOUT
4b: REAR SURFACE
5: MAIN GUIDE SHAPE
6: AUXILIARY GUIDE SHAPE
7: PROTRUDING PORTION
8: GUTTER
8a: COMMUNICATING PORTION
8b: TIP
K: IGNITION KEY

DETAILED DESCRIPTION OF THE EXEMPLARY EMBODIMENTS

Figure 1:
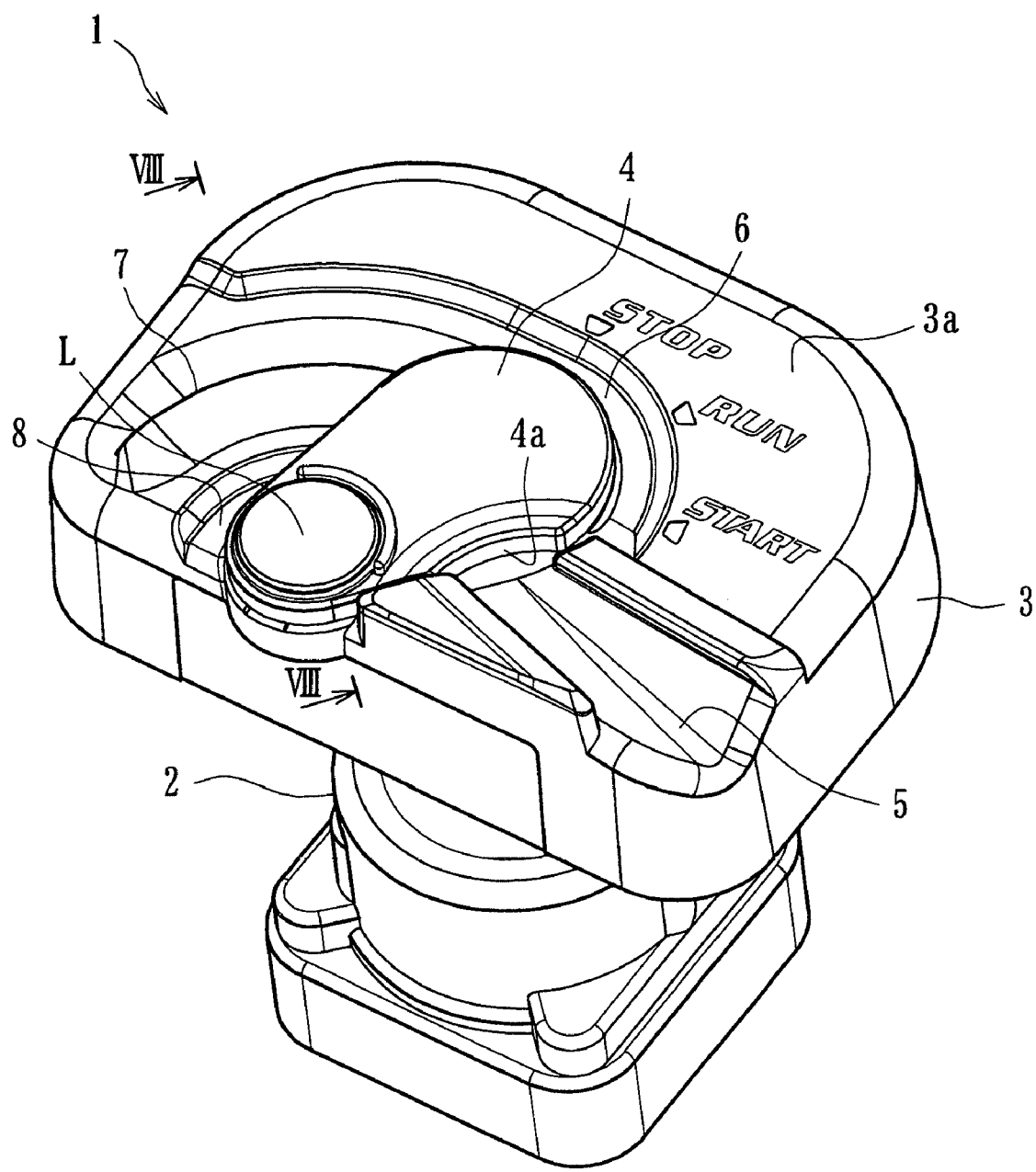
FIG. 1 is a perspective view showing an ignition switch device related to an embodiment of the invention.

An exemplary embodiment of the invention will be specifically explained with reference to the drawings. An ignition switch device related to the present embodiment is disposed in driver's seats of industrial machines (construction machines), such as bulldozers, power shovels, or crane vehicles to be used in worksites of engineering works or construction. As shown in FIG. 1, the ignition switch device is mainly composed of a switching means 2, a case 3, a shutter 4, a main guide shape 5, an auxiliary guide shape 6, a protruding portion 7, and a gutter 8.

The switching means 2 includes a key hole 2a (refer to FIG. 3) which allows a regular ignition key K to be inserted thereinto, and can be operated to rotate in a predetermined direction with the ignition key K inserted thereinto to thereby start and stop the engine of an industrial machine. Specifically, the switching means 2 constitutes a cylinder lock in which a plurality of tumblers are provided within the key hole 2a, or a versatile ignition switch including a switch board or the like which can be switched by forming or breaking a predetermined electric circuit by the rotation of the cylinder lock.

Figure 4:
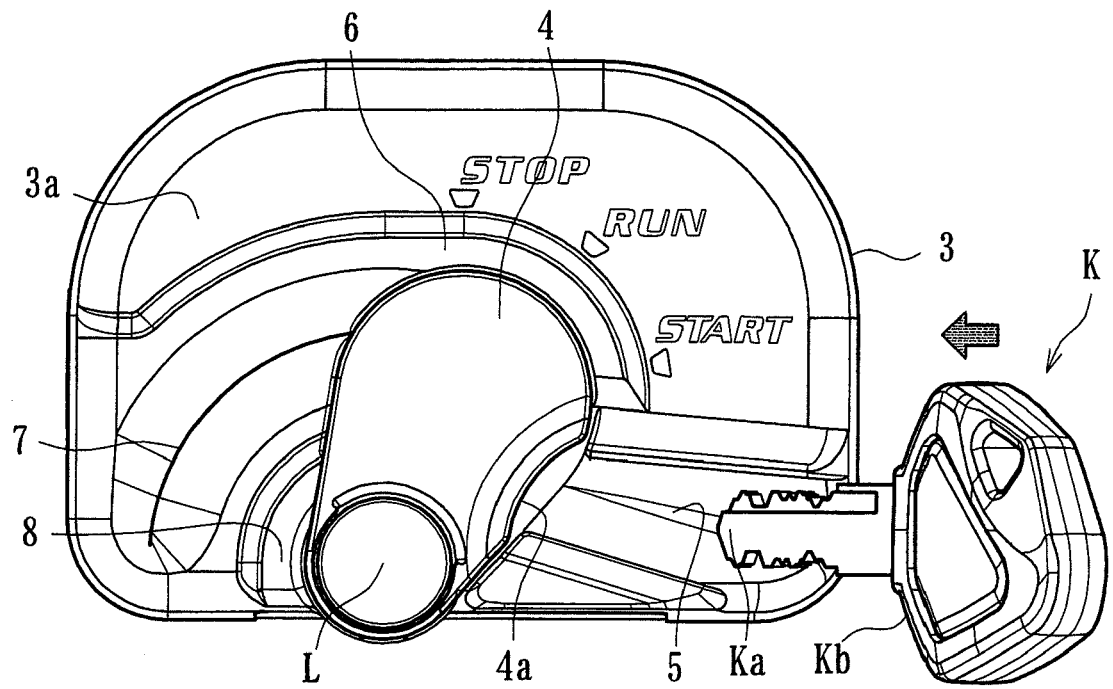
FIG. 4 is a view as seen from the upper surface in the ignition switch device, and is a view showing a process in which an ignition key is guided by a main guide shape.

The ignition key K, as shown in FIG. 4, is formed in the shape of a key while its tip (protruding end) Ka is formed in the shape of V, and is configured such that, if the ignition key is a regular one, the shape of the key matches the shape of the tumblers of the cylinder lock in the switching means 2 so that the cylinder lock can be rotated. In addition, reference numeral Kb denotes a gripping portion of the ignition key K, and a driver grips the gripping portion Kb to operate the ignition key K.

The case 3 is formed with an insertion hole 3b which allows the key hole 2a to face outside while covering an upper portion of the switching means 2, and printed letters or the like which indicate the position of the ignition key K is given to a surface 3a of the case. Further, the case 3 is a resin-molded product obtained by molding predetermined resin, and various shapes, such as the main guide shape 5, the auxiliary guide shape 6, the protruding portion 7, and the gutter 8 which will be explained in detail, are built in the surface of the case at the time of manufacture.

Figure 2:
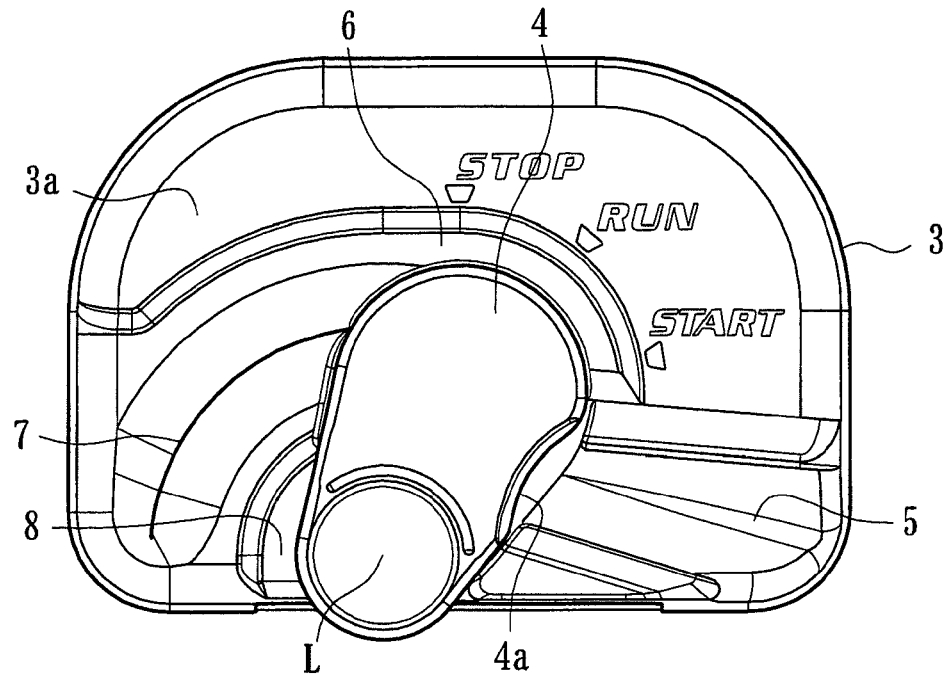
FIG. 2 is a plan view showing the ignition switch device (a shutter is in a closed position).
Figure 3:
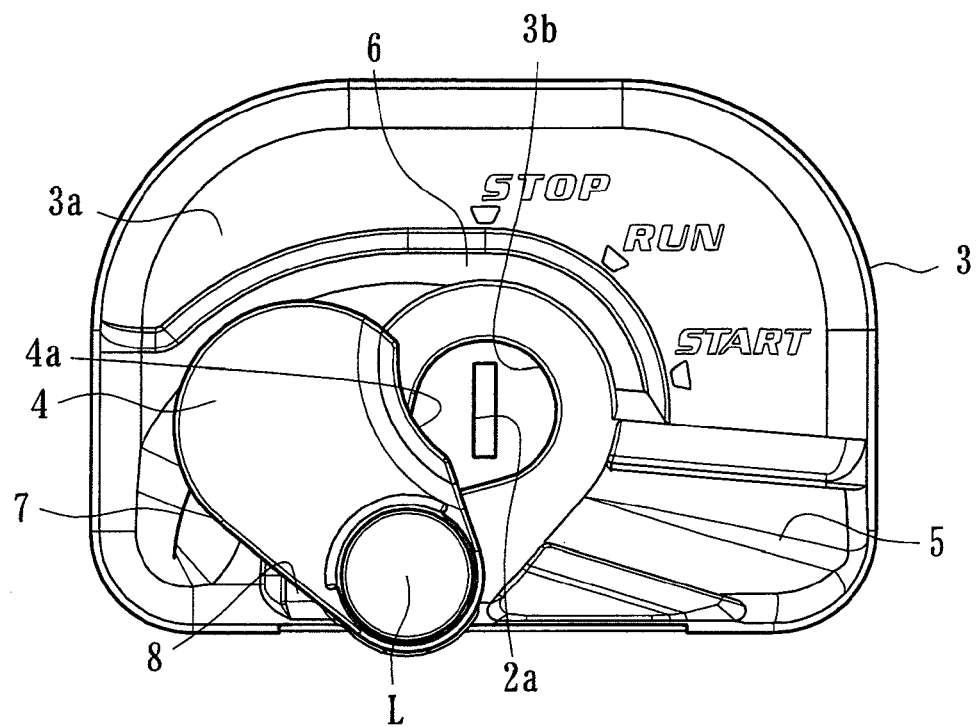
FIG. 3 is a plan view showing the ignition switch device (the shutter is in an open position).

The shutter 4 is disposed on the surface 3a of the case 3. As shown in FIGS. 2 and 3, the shutter is adapted to be rotatable about a rotary shaft L between a closed position (position shown in FIG. 2) where the insertion hole 3b of the case 3 is closed, and an open position (position shown in FIG. 3) where the insertion hole 3b is opened to allow the key hole 2a to face the outside (the upside).

Thereby, when such a shutter 4 is in the closed position, the shutter can cover the key hole 2a to prevent muddy water, dust, etc. from entering the key hole.

Figure 8:
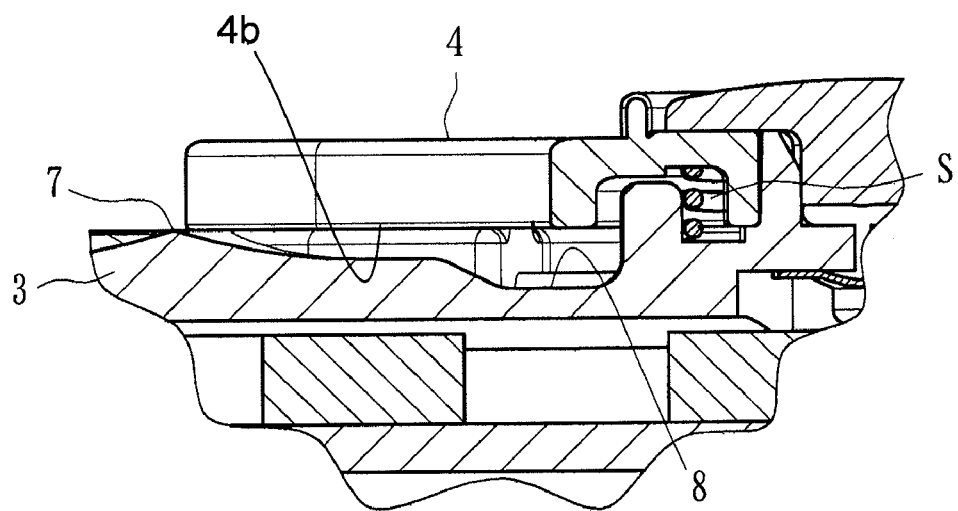
FIG. 8 is a sectional view taken along the line VIII-VIII in FIG. 1.

Further, the shutter 4 is biased in a direction in which the shutter is always in the closed position by a spring S (torsion coil spring or the like biased toward the closed position) as shown in FIG. 8. When the ignition key K is pulled out, the shutter 4 in the open position is rotated to the closed position and is naturally closed by the biasing force of the spring. Thereby, after the ignition key K is pulled out of the keyhole 2a, the operation which closes the shutter 4 becomes unnecessary, and consequently, operability can be further improved.

As shown in FIGS. 1 and 4, the main guide shape 5 is composed of a groove having a V-shaped cross-section, which is formed in the surface 3a of the case 3, and extends toward the insertion hole 3b (strictly speaking, cutout 4a of the shutter 4 which covers the insertion hole 3b) so that it can guide the tip Ka of the ignition key K to the key hole 2a. The main guide shape 5 extends substantially linearly to the insertion hole 3b from the edge of the case 3, and is configured such that its width becomes narrow toward the insertion hole 3b from the edge.

As shown in FIG. 1, the auxiliary guide shape 6 is formed on the surface 3a of the case 3 along a contour edge of the shutter 4 in the closed position, and extends toward the main guide shape 5 so that it can guide the tip Ka of the ignition key K to the main guide shape 5. That is, an upper (the side where printed letters are given) contour edge in the shutter 4 is formed in a circular arc as shown in the drawing, and the tip of the auxiliary guide shape communicates with the main guide shape 5 while the auxiliary guide shape 6 is formed along such a circular arc. Thus, if the tip Ka of the ignition key K is moved along the auxiliary guide shape 6, it reaches the main guide shape 5 from which it can be guided to the insertion hole 3b as described above.

Figure 5:
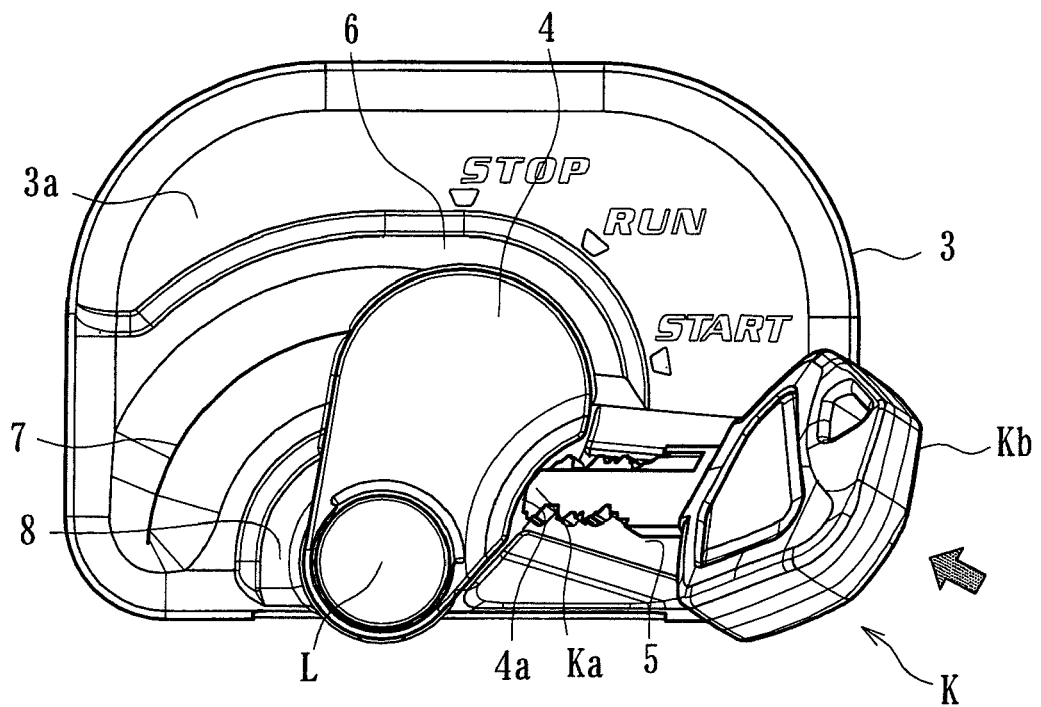
FIG. 5 is a view as seen from the upper surface in the ignition switch device, and is a view showing a state in which the ignition key guided by the main guide shape has abutted on a cutout of the shutter.

Meanwhile, a circular-arc cutout 4a which allows the tip Ka of the ignition key K guided by the main guide shape 5 to abut thereon is formed in a position on an extension of the main guide shape 5 of the shutter 4. Also, as shown in FIG. 5, if the tip Ka of the ignition key K guided by the main guide shape 5 is made to abut on the cutout 4a, and thereafter further moved in this direction, the tip Ka presses the shutter 4 via the cutout 4a so that the shutter 4 can be rotated about the rotary shaft L.

Figure 6:
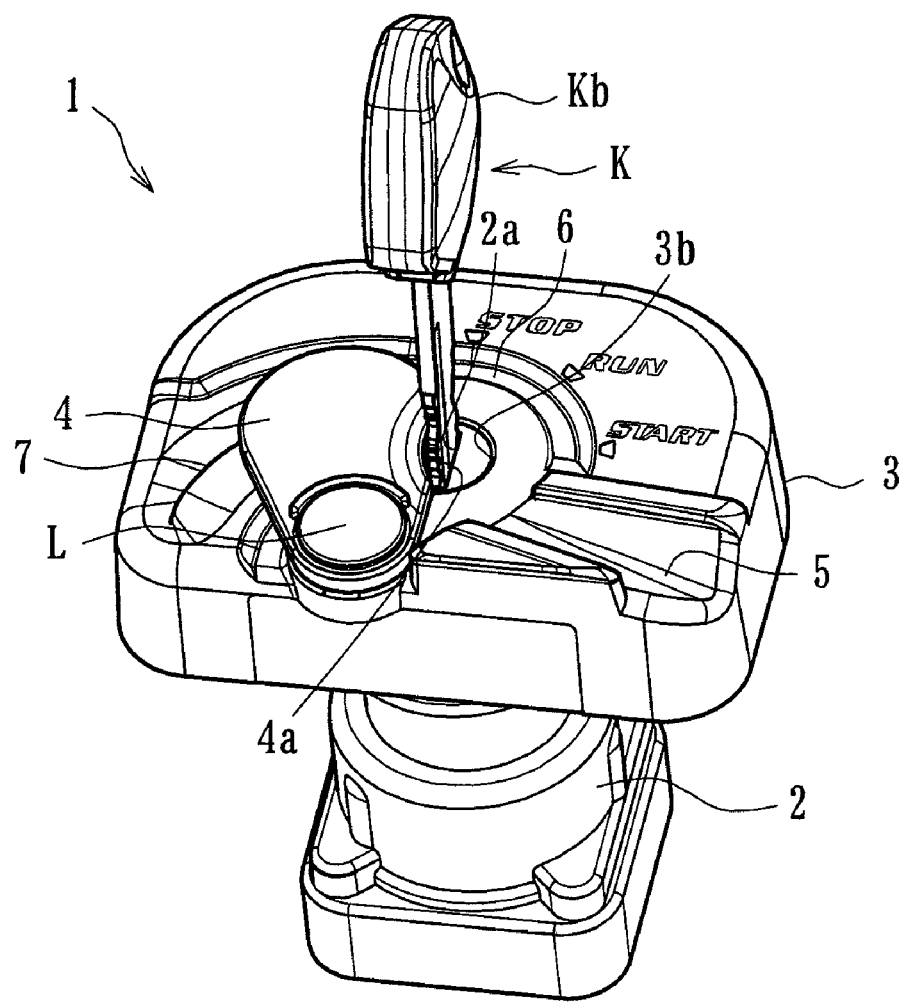
FIG. 6 is a perspective view showing a state where the ignition key has matched a key hole in the ignition switch device.

Here, in the present embodiment, during the rotation of the shutter 4, the cutout 4a and the key hole 2a are set so as to be parallel to each other, and the tip Ka of the ignition key K which is pressing the cutout 4a is configured so as to match the formation position of the key hole 2a. Thus, while the shutter 4 is rotated to the open position by the tip Ka of the ignition key K, as shown in FIG. 6, the tip Ka of the ignition key K will match the key hole 2a. If the ignition key K is pushed into the switching means 2 from this state, the key can be inserted into the key hole 2*a*.

Thereafter, if the ignition key K inserted into the key hole 2*a* is rotated in a predetermined direction (right direction in the present embodiment), the switching means 2 can be operated to start the engine of the industrial machine. Further, if the ignition key K is rotated in an opposite direction (left direction in the present embodiment) in order to stop the engine of the industrial machine, the switching means 2 can be operated to stop the engine.

In addition, since the shutter 4 is biased toward the closed position at the time of the rotation of the ignition key K as described above, the cutout 4*a* and the ignition key K are in an abutting state. However, since the cutout 4*a* is formed in a circular arc, the rotational operation of the ignition key K can be smoothly performed. Also, if the ignition key K is pulled out of the key hole 2*a*, as already mentioned, the shutter 4 will be rotated to the closed position and naturally closed by the biasing force of the spring.

Figure 7:
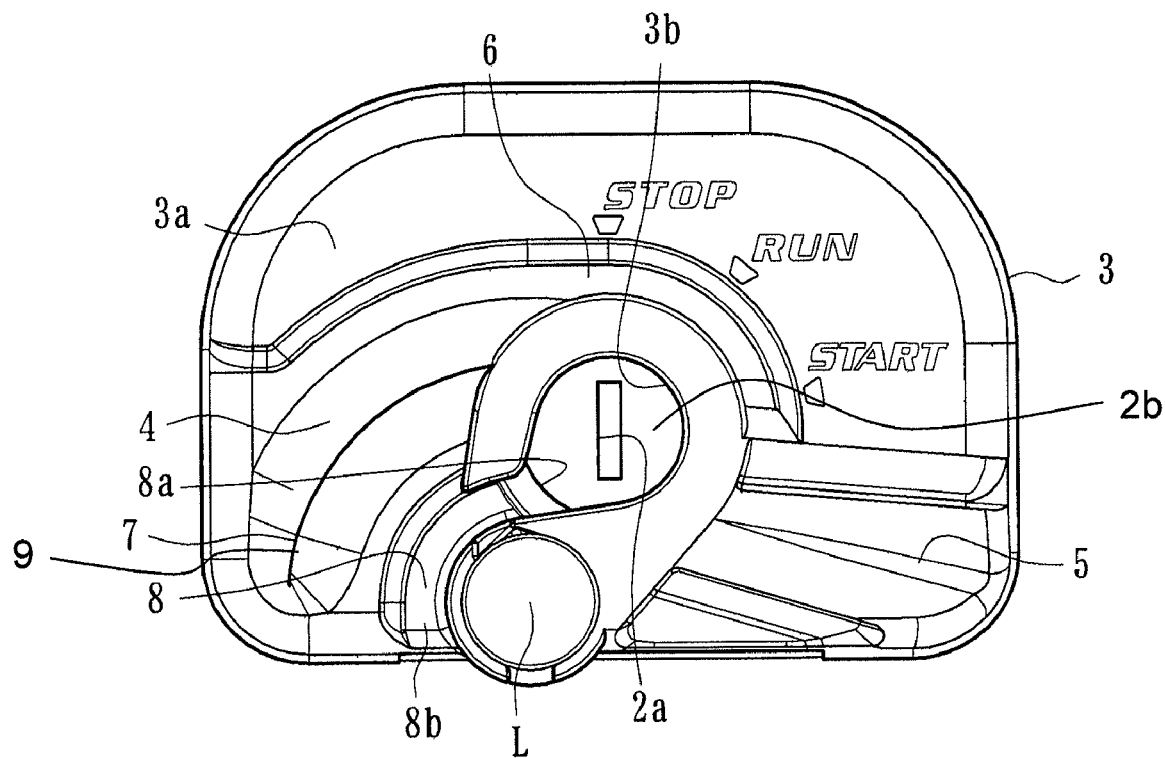
FIG. 7 is a plan view showing a state where the shutter in the ignition switch device is detached.

The protruding portion 7 is formed within the range of rotation of the shutter 4 while protruding from the surface 3*a* of the case 3, and as shown in FIG. 7, the protruding portion is set such that its protruding end contacts a rear surface 4*b* of the shutter 4 while the shutter 4 rotates. As shown in this drawing, the protruding portion 7 is formed such that its protruding end 9 is sharpened, and is configured such that the contact surface thereof with the rear surface 4*b* of the shutter 4 becomes linear. Thereby, the shutter 4 will rotate while making the rear surface 4*b* thereof contact the protruding end 9 of the protruding portion 7. As a result, smooth rotation of the shutter 4 can be performed, and the surface 3*a* of the case 3 can be kept from being scratched, thereby maintaining design quality.

Figure 9:
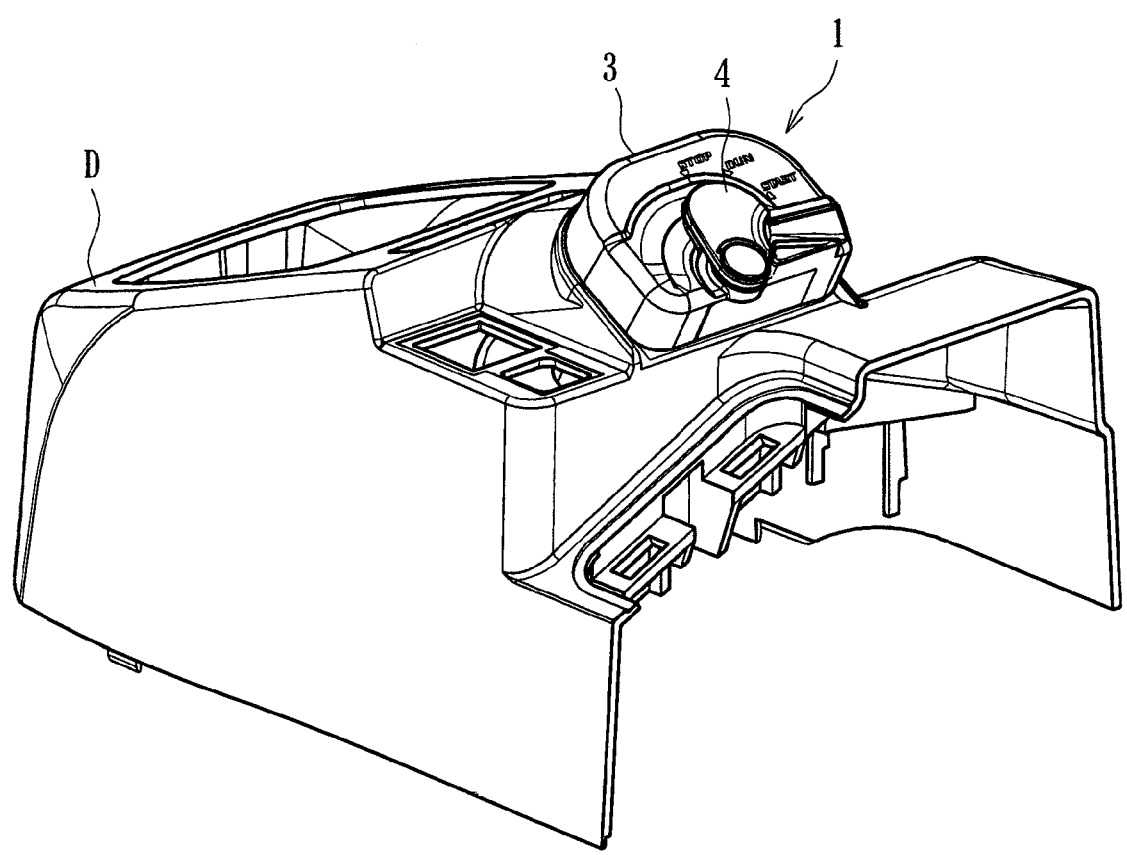
FIG. 9 is a perspective view showing a state where the ignition switch device has been attached to an attaching member D to be installed in a driver's seat of an industrial machine.

Here, in the present embodiment, as shown in FIG. 9, the ignition switch device 1 is attached in an inclined state to an attaching member D to be installed in a driver's seat. Thus, the case 3 is attached in an inclined manner such that its lower edge is located below its upper edge, and the gutter 8 for discharging rain or the like which has entered the insertion hole 3*b* is formed in the surface 3*a* of the case 3. In addition, the case 3 may be attached in a vertical state or a horizontal state, not limited to the inclined state.

The gutter 8, as shown in FIGS. 7 and 8, is formed in the shape of a groove which extends toward the lower edge of the case 3 while communicating with the insertion hole 3*b*, and a bottom surface in a communicating portion 8*a* communicating with the insertion hole 3*b* is set to substantially the same height as a surface 2*b* having the key hole 2*a* of the switching means 2 (the relative height between the communicating portion 8*a* and the surface 2*b*, which is not the height when the ignition switch device 1 is attached).

Further, as shown in FIGS. 2, 3, or 8, at least the upper portion of the gutter 8 on the side of its base end (on the side of the communicating portion 8*a*) is covered with the shutter 4. Thereby, at least the portion of the gutter 8 on the side of its base end can be concealed, and the design property of the surface 3*a* in the case 3 can be improved. Also, the communicating portion 8*a* communicating with the insertion hole 3*b* is covered so that foreign matters or the like can be kept from entering the insertion hole through the communicating portion 8*a*. In addition, the whole upper portion of the gutter 8 may be covered with the shutter 4.

Furthermore, since a tip 8*b* of the gutter 8 reaches the lower edge of the case 3, the water within the insertion hole 3*b* can be released from the lower edge in the case 3, and can be prevented from stagnating at the surface of the case 3. In addition, it is possible to adopt a configuration in which the tip of the gutter does not reach the lower edge of the case 3, but reaches the surface 3*a* of the case 3, while the base end of the gutter 8 is made to communicate with the insertion hole 3*b* by the communicating portion 8*a*. Further, it is sufficient if the gutter 8 extends toward an outer end of the case 3 while its base end communicates with the communicating hole 3*b*.

Accordingly, according to the present embodiment, the gutter 8 which extends toward the lower edge of the case 3 while communicating with the insertion hole 3*b* of the case 3 is formed in the surface 3*a* of the case 3. Thus, the rain or the like which has entered the insertion hole 3*b* can be quickly and satisfactorily discharged toward the lower edge of the case 3, and the rain or the like can be prevented from stagnating in the vicinity of the key hole 3*a* (specifically, a concave space which is formed by an inner peripheral wall of the insertion hole 3*b* and the surface 2*b* having the key hole 2*a*).

Further, a bottom surface in the communicating portion 8*a* of the gutter 8 communicating with the insertion hole 3*b* is set to substantially the same height as the surface 2*b* having the key hole 2*a* of the switching means 2. Thus, the bottom surface and the surface 2*b* having the key hole becomes substantially flush with each other. As a result, the rain or the like which has entered the insertion hole 3*b* can be smoothly and surely discharged from the gutter 8. In addition, the height of the bottom surface of the communicating portion 8*a* may be relatively lower than the surface 2*b* having the key hole 2*a*.

In addition, in the present embodiment, a driver who is going to start the engine finds the key hole not with his/her eyes, but with his/her hand. If the tip Ka of the ignition key K abuts on the surface 3*a* of the case 3, is suitably moved along the surface 3*a* as it is, and thereby inserted into the main guide shape 5 or the auxiliary guide shape 6, the tip Ka is guided to the shutter 4 which covers the insertion hole 3*b* along the main guide shape 5 and the auxiliary guide shape 6. Then, if the tip is further moved in this direction from the state where it abuts on the cutout 4*a* of the shutter 4, the shutter 4 can be rotated and be guided to the key hole 2*a*.

Although the present embodiment has been described hitherto, the invention is not limited thereto. For example, the main guide shape 5, the auxiliary guide 6, and the protruding portion 7 may not be formed, but only the gutter 8 may be formed with the range of rotation of the shutter 4. Further, although the gutter 8 related to the present embodiment is formed in a circular arc in the surface 3*a* of the case 3 along the outer peripheral surface of the rotary shaft L, the gutter may be linearly formed in the surface 3*a*.

In addition, industrial machines to which the invention can be applied include, for example, various machines, such as bulldozers, scrape dozers, hydraulic shovels (backhoes, power shovels, etc.), and tractors with a crane apparatus.

The invention can also be applied to ones whose appearance shapes are different or to ones to which other functions are added so long as it is an ignition switch device provided with the gutter which is formed on the surface of the case, and extends toward the lower edge of the case while a base end communicates with the insertion hole.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. An ignition switch device comprising:

a switching means having a key hole allowing a regular ignition key to be inserted thereinto, and capable of being rotationally operated in a predetermined direction with the inserted ignition key to start and stop an engine of an industrial machine;

a case covering the switching means and formed with an insertion hole allowing the key hole to face the outside;

a shutter disposed on a surface of the case, and rotatable substantially parallel to the surface between a closed position where the insertion hole of the case is closed and an open position where the insertion hole is opened to allow the key hole to face outside; and a gutter formed on the surface of the case and extending toward an outer end of the case, wherein a base end of the gutter communicates with the insertion hole, to allow water to drain toward an outer end of the case.

2. The ignition switch device according to claim 1, wherein a bottom surface in a communicating portion of the gutter communicating with the insertion hole is set to substantially the same height as a surface having the key hole of the switching means.

3. The ignition switch device according to claim 1, wherein at least an upper portion of the gutter on the side of its base end is covered with the shutter.

4. The ignition switch device according to claim 1, wherein a tip of the gutter reaches a lower edge of the case.

5. The ignition switch according to claim 1, wherein at least an upper portion of the gutter on the side of its base end is covered with the shutter when the shutter is in the closed position.

6. The ignition switch according to claim 1, wherein the bottom surface of the gutter is no higher than the height of a surface having the key hole of the switching means.

7. The ignition switch according to claim 1, further comprising a guide means for guiding the ignition key towards the key hole, wherein the guide means is separate and distinct from the gutter.

8. The ignition switch according to claim 1, wherein the gutter extends to an outer edge of the case.

* * * * *